US008457838B1

(12) United States Patent
Fear et al.

(10) Patent No.: US 8,457,838 B1
(45) Date of Patent: Jun. 4, 2013

(54) SYSTEM AND METHOD FOR SAFE OPERATION OF A VEHICLE BASED ELECTRONIC DEVICE WHILE THE VEHICLE IS IN MOTION

(75) Inventors: Andrew C. Fear, Campbell, CA (US); William Samuel Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 1293 days.

(21) Appl. No.: 11/273,986

(22) Filed: Nov. 14, 2005

(51) Int. Cl.
*G06F 7/00* (2006.01)

(52) U.S. Cl.
USPC .................................. 701/36; 701/1; 701/400

(58) Field of Classification Search
USPC .............. 701/1, 45, 46, 47, 36, 200; 280/728, 280/735, 734; 307/10.6; 180/268; 340/988, 340/990, 995; 73/178 R
See application file for complete search history.

(56) References Cited

U.S. PATENT DOCUMENTS

| 4,528,563 | A | | 7/1985 | Takeuchi |
| 5,471,389 | A | * | 11/1995 | Hahlganss ................. 455/456.6 |
| 6,029,110 | A | * | 2/2000 | Zuber et al. ................... 701/200 |
| 6,087,961 | A | | 7/2000 | Markow |
| 6,097,285 | A | | 8/2000 | Curtin |
| 6,181,996 | B1 | * | 1/2001 | Chou et al. ...................... 701/36 |
| 6,587,770 | B1 | * | 7/2003 | Gray et al. ....................... 701/45 |
| 6,684,176 | B2 | | 1/2004 | Willins et al. |
| 6,731,204 | B2 | | 5/2004 | Lehmann |
| 6,778,073 | B2 | | 8/2004 | Lutter et al. |
| 6,876,298 | B2 | | 4/2005 | Litkouhi et al. |
| 7,188,005 | B2 | | 3/2007 | Toba et al. |
| 7,649,444 | B1 | | 1/2010 | Fear et al. |
| 2007/0032912 | A1 | * | 2/2007 | Jung et al. ......................... 701/1 |

FOREIGN PATENT DOCUMENTS

WO    WO2005016701    * 2/2005

OTHER PUBLICATIONS

Translation for WO2005016701 included with original WIPO Publication.*

* cited by examiner

*Primary Examiner* — Khoi Tran
*Assistant Examiner* — Bhavesh V Amin

(57) ABSTRACT

Embodiments of the present invention include a computer-controlled method for safely operating a vehicle based electronic system. The method includes receiving a first signal from a first sensor, wherein the first sensor is for identifying the presence of a passenger located in a passenger seat of the vehicle. This may be the configuration of a seat belt associated with the passenger seat. The method further includes receiving a second signal from a second sensor, wherein the second sensor is for determining a weight of the passenger in the passenger seat. Provided the passenger is located in the passenger seat and the weight of the passenger in the passenger seat is above or equal to a threshold value, the method further includes allowing programming functionality of the electronic system while the vehicle is in motion. In one embodiment, the electronic system is a vehicle based navigation system.

18 Claims, 4 Drawing Sheets

SYSTEM AND METHOD FOR SAFE OPERATION OF A VEHICLE BASED ELECTRONIC DEVICE WHILE THE VEHICLE IS IN MOTION

FIELD OF THE INVENTION

The present invention is related to the field of vehicle-based electronic systems. More specifically, embodiments of the invention are directed to a system and method for safe operation of a vehicle based electronic system while the associated vehicle is in motion.

BACKGROUND ART

Heavy traffic and ever increasing complexity of roadway systems make navigating a vehicle ever more difficult. With the advance of global positioning systems (GPS) and computer technology, conventional road maps have been transformed into computer displays on vehicle-based navigation systems that display the current location of the vehicle. A conventional vehicle based navigation system operates by GPS and a CD-ROM with a digital road map (e.g., touch sensitive display) that holds all the information the system needs to display for the directions to a pre-selected destination.

The digital road map also functions as a user interface for the navigation unit. For safety considerations, some government regulations only allow conventional vehicle based navigation systems to be programmed (e.g., a destination address can be entered) when the vehicle is stopped. In some cases, the vehicle must be in a parking gear and the emergency brake must be applied to program the device (e.g., enter a destination address). In other cases, the vehicle must be stopped with the brake pedal engaged before the navigation system can be programmed.

As a result, prior to driving, the driver must enter the destination address in the control unit. The computer then maps out the best route to reach the driver's destination. However, if the driver wants to change the destination or the route, the driver must stop the vehicle in a safe location and apply the parking brake or brake pedal before re-programming the device.

Although these safeguards prevent a driver from becoming distracted while driving, unfortunately also, they prevent a passenger of the vehicle from modifying the navigation system while the vehicle is in motion, which is very inconvenient and inefficient because passenger interaction with the navigation system does not pose any substantial safety issues.

SUMMARY OF THE INVENTION

Accordingly, a system and method for safe operation of a vehicle based electronic system while the vehicle is in motion would be advantageous. Embodiments of the present invention include a computer-controlled method for safely operating a vehicle based electronic system. In one embodiment of the present invention, the method includes receiving a first signal from a first sensor, wherein the first sensor is for identifying the presence of a passenger located in a passenger seat of the vehicle. This may be the configuration of a seat belt associated with the passenger seat. The method further includes receiving a second signal from a second sensor, wherein the second sensor is for determining a weight of the passenger in the passenger seat. Provided the passenger is located in the passenger seat and the weight of the passenger in the passenger seat is above or equal to a threshold value, the method further includes allowing programming functionality of the electronic system while the vehicle is in motion. In one embodiment of the invention, the electronic system is a vehicle based navigation system.

In one embodiment of the invention, the passenger is able to modify a destination address on the navigation system while the vehicle is in motion. In another embodiment of the invention, the method further comprises receiving a signal from a third sensor, wherein the third sensor is for determining an angle of incidence of a user interacting with the electronic system. Provided the angle of incidence associated with the interaction is within an allowable range (e.g., coming from the passenger side), the method further includes allowing programming functionality of the electronic system while the vehicle is in motion.

Embodiments of the present invention also include a system for providing safe operation of an electronic device while the vehicle is in motion. In one embodiment of the invention, the system comprises a navigation system comprising a first input for receiving a signal from a first vehicle-mounted sensor for identifying the presence a passenger located in a passenger seat of the vehicle (e.g., seatbelt sensor). The navigation system further includes a second input for receiving a second signal from a second vehicle-mounted sensor for determining a weight of the passenger in the passenger seat. The navigation system further includes a determiner coupled to the first input and the second input for allowing programming functionality of the navigation system when the vehicle is in motion provided the first signal indicates the passenger is located in the passenger seat and further provided the second sensor indicates the weight of the passenger seat is above or equal to a threshold value.

The system further includes a third vehicle-mounted sensor for determining an angle of interaction (e.g., incidence) of a user of the vehicle based navigation system. Provided the angle of incidence associated with the interaction is within an allowable range (e.g., coming from the passenger side), the system allows programming functionality of the navigation system while the vehicle is in motion.

In one embodiment of the invention, the inputs are coupled to an airbag deployment system associated with the vehicle. In one embodiment of the invention, the system restricts programming functionality of the navigation system when the vehicle is in motion and if a passenger is below a predetermined weight and/or a passenger seatbelt is not engaged.

BRIEF DESCRIPTION OF THE FIGURES

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
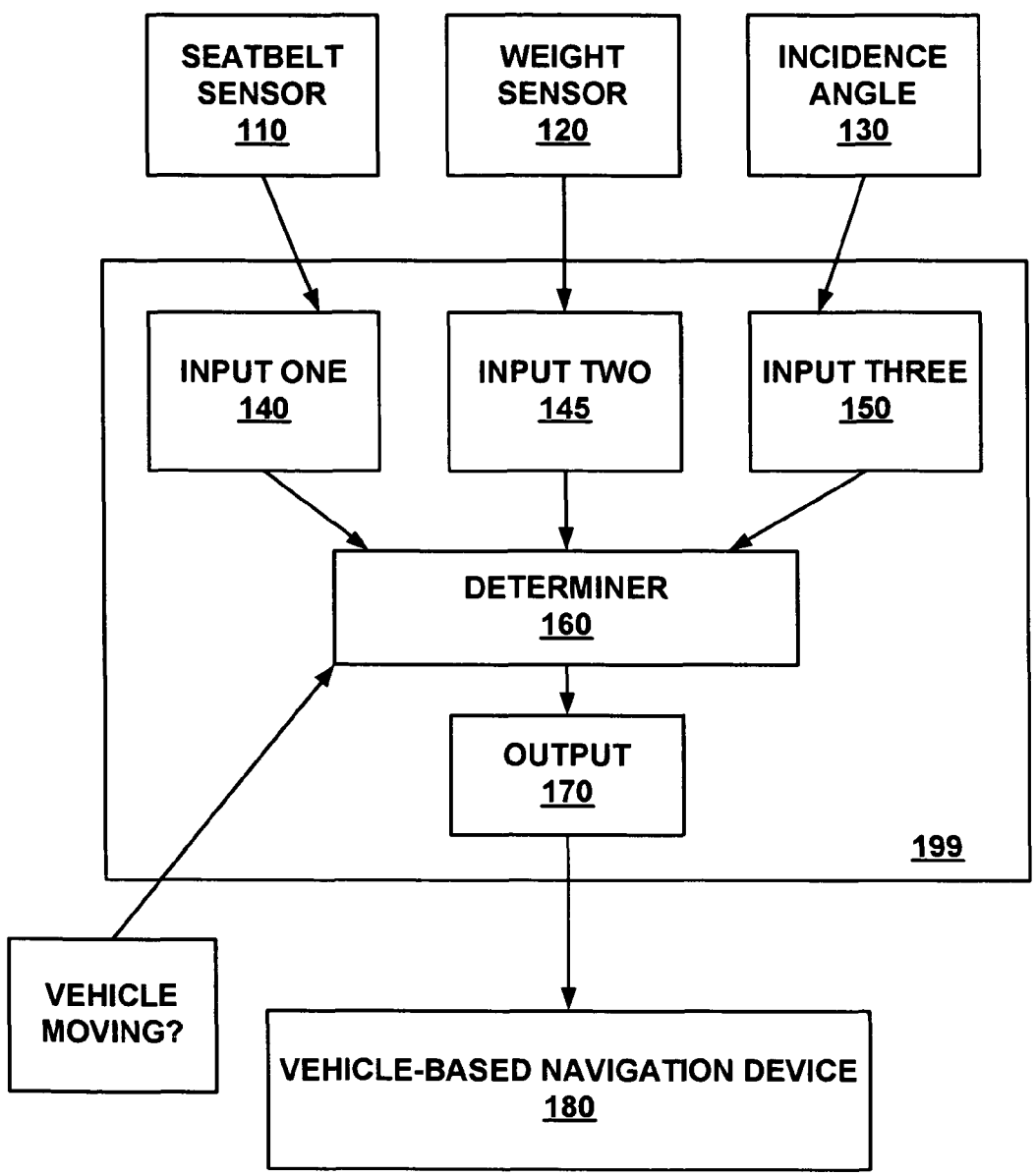
FIG. 1 is a block diagram of an exemplary system for safely operating a vehicle based navigation system while the vehicle is in motion in accordance with embodiments of the present invention.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "receiving," "displaying," "retrieving," "sensing," "generating," "outputting," "detecting," "accessing," "processing," "maximizing," "allocating," "preventing," "allowing" or the like, refer to actions and processes (e.g., flowchart 200 of FIG. 2) that may partially or totally be performed on a computer system or similar electronic computing device or processor. The computer system or similar electronic computing device manipulates and transforms data represented as physical (electronic) quantities within the computer system memories, registers or other such information storage, transmission or display devices.

Embodiments of the present invention include a system and method for safely operating a vehicle based navigation system while the vehicle is in motion. It is appreciated that embodiments of the present invention can be implemented with any electronic device and the navigation system of the present invention is an example of such an electronic device. For example, the present invention can be used to limit use of an entertainment system (e.g., such as a cell phone speaker phone, stereo, navigation system, etc.) to a passenger while the vehicle is in motion. Another example is a vehicle based computer system with a connection to the Internet, for example. The present invention can limit use of the computer system to the passenger while the vehicle is in motion.

In one embodiment of the invention, a plurality of safeguards is used to allow only a passenger of a vehicle to operate e.g., program, the navigation unit (or any other vehicle based electronic system) while the vehicle is in motion. Passenger detection may include determining that the passenger is above a predetermined threshold weight and determining that the passenger's seatbelt is engaged. In one embodiment of the invention, an angle of incidence (e.g., angle of an operator with respect to the navigation device) of user interaction with the navigation controls is measured to determine if the user attempting to use the navigation device is seated in the driver's seat or the passenger's seat. Provided the angle of incidence corresponds to a passenger position, the system allows functionality of the navigation unit while the vehicle is in motion. Provided the angle of incidence corresponds to a driver position, the system prevents some functionality of the navigation system, for example, changing the destination address while the vehicle is in motion. In one embodiment of the invention, all three factors need to be met before in-motion navigation programming is allowed, e.g., a) the passenger seat belt needs to be engaged, b) the passenger weight sensor needs to report a weight above a predetermined threshold, and c) the angle of incidence of a user interaction with the navigation controls needs to indicate passenger interaction.

FIG. 1 is a block diagram of an exemplary system 100 for safely operating a vehicle-based electronic system (e.g., navigation system 180) while the vehicle is in motion in accordance with embodiments of the present invention. System 100 includes a passenger side seatbelt sensor 110 for determining if a seatbelt is engaged or disengaged on a front passenger seat of the vehicle. In one embodiment of the invention, seatbelt sensor 110 is directly coupled to a front passenger side seatbelt mechanism (e.g., a switch) and generates a signal indicating that the seatbelt is engaged or a signal that indicates that the seatbelt is disengaged. In one embodiment of the invention, the seatbelt sensor 110 is coupled to an airbag deployment system, which may additionally use the information provided by the seatbelt sensor 110 to decide whether or not to deploy an airbag. It is appreciated that seatbelt sensor 110 can be any sensor that can determine if a seatbelt or restraint is engaged, e.g., electrical, mechanical, optical, etc.

In one embodiment of the invention, seatbelt sensor 110 provides a signal to input one 140 of the controller 199 for safely operating a vehicle based navigation system 180. In one embodiment of the invention, controller 199 is included in the vehicle based navigation system, however, it is appreciated that controller 199 can be a stand-alone unit and may be processor based.

System 100 further includes a weight sensor 120 for sensing a weight of a passenger seated in the front passenger seat of the vehicle. In one embodiment of the invention, the weight sensor 120 is a pressure sensitive switch, however it is appreciated that weight sensor 120 can be any sensor that can sense a weight of a passenger that is positioned in the front passenger seat of the vehicle. In one embodiment of the invention, the weight sensor 120 may be coupled to an airbag deployment system, which uses the information provided by the weight sensor 120 to decide whether or not to deploy an airbag. For example, the airbag is not deployed if the passenger is below a threshold weight (e.g., is a child). In one embodiment of the invention, the weight sensor 120 provides a signal to input two 145 of controller 199. In one embodiment of the invention, the weight sensor provides a signal indicating the weight of the passenger. In another embodiment of the invention, the weight sensor 120 comprises logic that can determine if the weight is above a threshold value. In this case, the weight sensor provides a binary signal to input two 145 whether the passenger satisfies the weight requirements or not.

System 100 further includes an angle of incidence sensor 130 for determining an angle of incidence of an operator interaction with the control panel of the vehicle based navigation system 180 in accordance with embodiments of the present invention. In one embodiment of the invention, the vehicle based navigation system 180 comprises a touch sensitive display (or infrared receiver), which can be used as a user interface. In one embodiment of the invention, the angle of incidence sensor 130 is coupled to the touch sensitive display and can determine an angle of a finger operating the screen, for example. Alternatively, the sensor may sense the angle of the hand or arm of the user interfacing with the control panel, e.g., by infrared, etc. techniques.

In another embodiment of the invention, the incidence angle sensor 130 measures the direction of a voice command. For example, a microphone could be placed on each side (e.g., passenger side and the driver side) of the vehicle and the source of the voice command can be determined by the strength of the signal received at each microphone. It is appreciated that incidence angle sensor 130 can be any sensor that can determine the location of a user of the vehicle based navigation system 180 in accordance with embodiments of the present invention. In one embodiment of the invention, the incidence angle sensor 130 provides a signal to input three 150 of the controller 199.

Controller 199 comprises input one 140 for receiving a signal from the seatbelt sensor 110, input two 145 for receiving a signal from the weight sensor 120 and input three for receiving a signal from the incidence angle sensor 130. It is appreciated that seatbelt sensor 110, weight sensor 120 or incidence angle sensor 130 can communicate with controller 199 via a wired connection or a wireless connection.

Controller 199 further comprises a determiner 160 for determining whether or not to limit functionality of the vehicle based navigation system 180 in accordance with embodiment of the present invention. In one embodiment of the invention, determiner 160 determines if a front passenger seatbelt is engaged based on the signal received at input one 140. The determiner 160 further determines a weight of a passenger based on the signal received at input two 145. The determiner also determines an incidence angle of a user interaction of the vehicle based navigation system 180 based on the signal received at input three 150. In one embodiment of the invention, the determiner 160 allows a passenger to operate the vehicle based navigation system 180 while the vehicle is moving if the front passenger seatbelt is engaged, the passenger's weight satisfies a threshold value and if the angle of incidence meets a threshold value. In another embodiment of the invention, the determiner 160 allows a passenger to operate the vehicle based navigation system 180 while the vehicle is moving if two of the three requirements are satisfied. If the vehicle is stopped, and the brake is applied, then these signals 140, 145, and 150 are ignored. In one embodiment of the invention, vehicle movement can be determined from a GPS system of the navigation system (e.g., coupled to the speedometer). In another embodiment of the invention, a signal indicating movement of the vehicle is accessed from another sensor associated with the vehicle.

Controller 199 further comprises an output 170 for coupling to the vehicle based navigation system 180. In one embodiment of the invention, the output 170 signals to the vehicle based navigation system 180 determine whether or not to allow a passenger to operate the vehicle based navigation system 180 while the vehicle is moving. This signal may be called a safety mode signal. When asserted, the safety mode may limit functionality of the navigation system to prevent road hazards.

Figure 2:
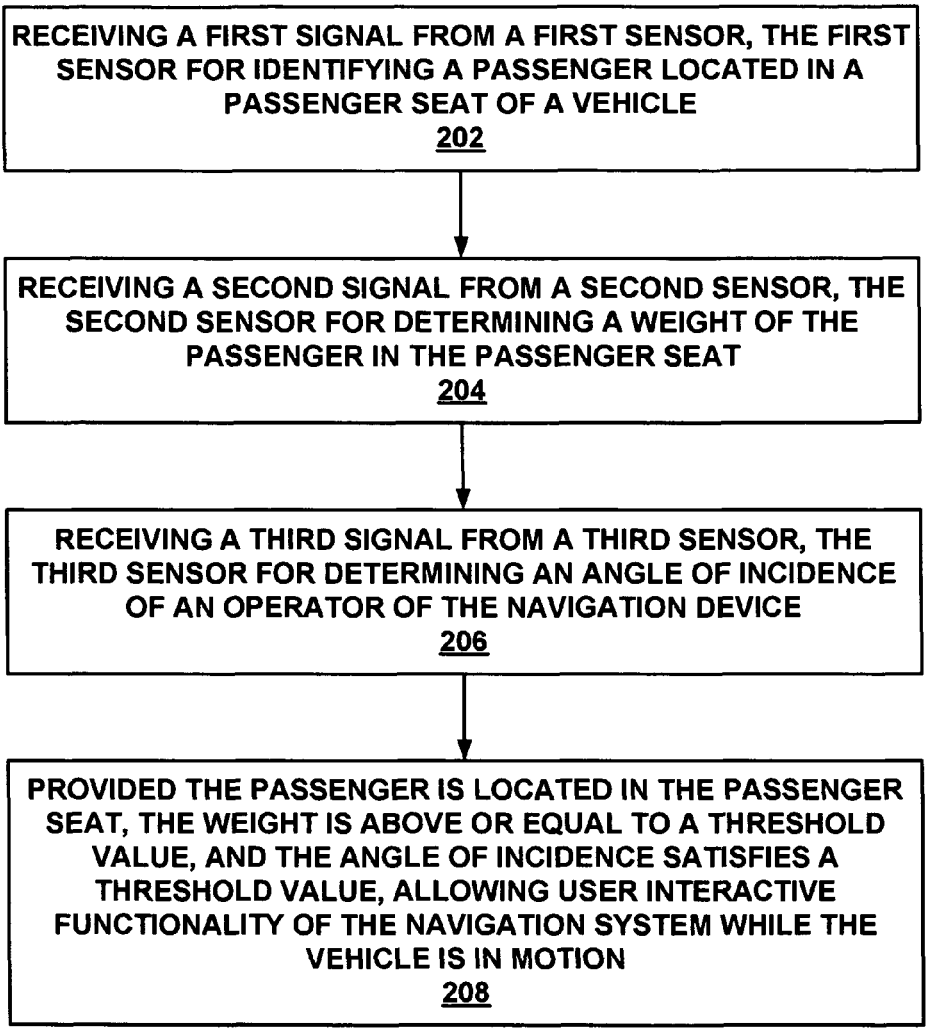
FIG. 2 is flow diagram of an exemplary computer controlled method for safely operating a vehicle based navigation system while the vehicle is in motion in accordance with embodiments of the present invention.

FIG. 2 is a flow diagram of an exemplary computer implemented method 200 for safely operating a vehicle based navigation system in accordance with embodiments of the present invention. At step 202, method 200 includes receiving a first signal from a first sensor, wherein the first sensor is for identifying a passenger located in a passenger seat of the vehicle. In one embodiment of the invention, the first signal is generated by an airbag deployment system associated with the vehicle and may be based on the configuration of a seat belt latch as described above.

At step 204, method 200 includes receiving a second signal from a second sensor, wherein the second sensor is for determining a weight of the passenger in the passenger seat. In one embodiment of the invention, the second signal is generated by an airbag deployment system associated with the vehicle.

At step 206, method 200 includes receiving a third signal from a third sensor, wherein the third sensor is for determining an angle of incidence of an operator interaction of the navigation device. In one embodiment of the invention, a touch sensitive display device associated with the vehicle navigation system generates a signal indicating the angle of incidence of a user. In another embodiment of the invention, the angle of incidence is determined by locating the source of a voice command.

At step 208, method 200 includes provided the passenger is located in the passenger seat, the weight is above or equal to a threshold value and the angle of incidence satisfies a threshold value, allowing functionality of the navigation system while the vehicle is in motion. In one embodiment of the invention, satisfying two of the three safeguards allows the passenger to operate the vehicle based navigation while the vehicle is moving. In one embodiment of the invention, a passenger is allowed to re-program a destination address while the vehicle is in motion.

Figure 3:
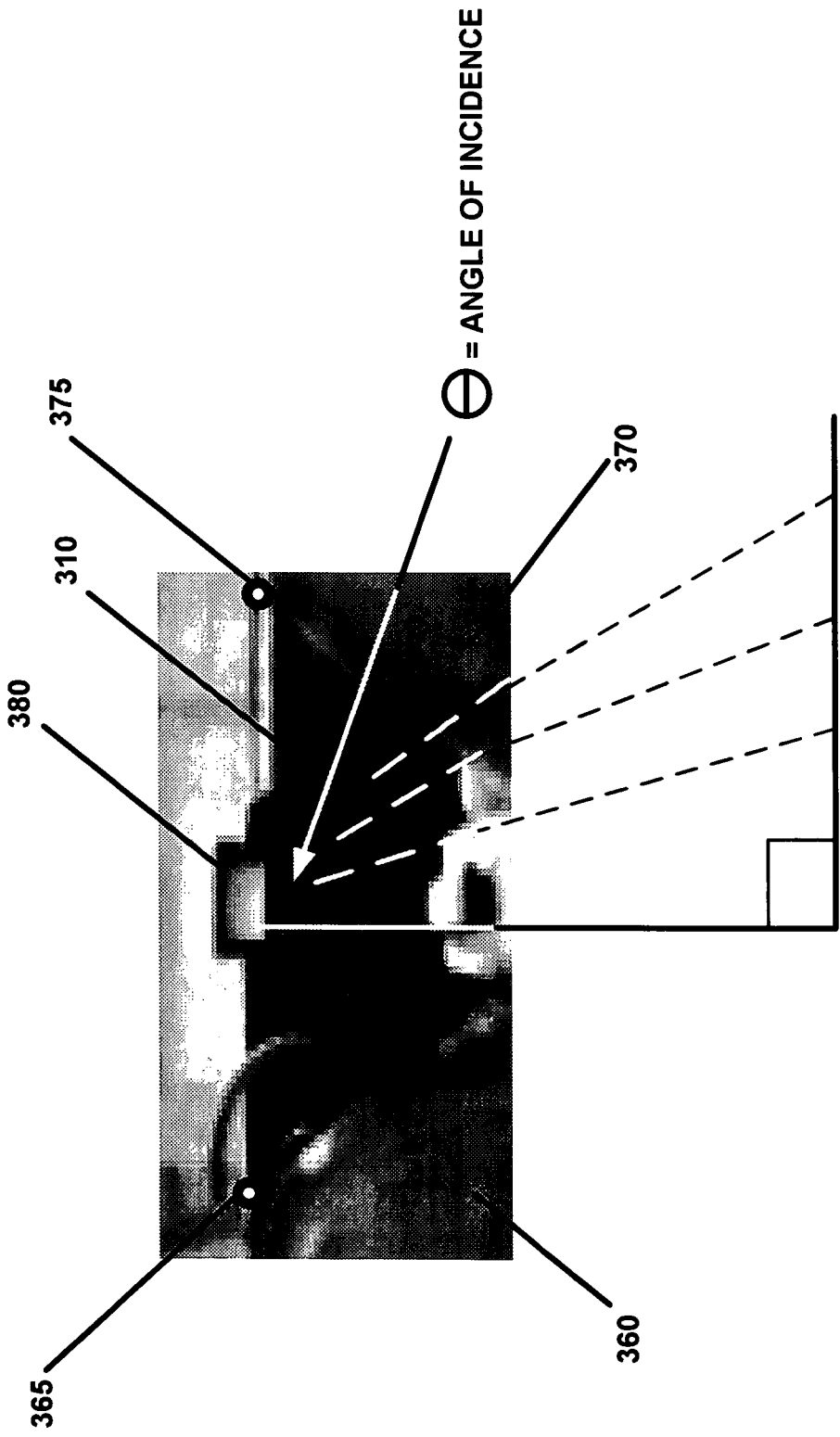
FIG. 3 is an illustration of an exemplary system for measuring an angle of incidence of user interaction with a vehicle based navigation system in accordance with embodiments of the present invention.

FIG. 3 is an illustration of an exemplary system for measuring an angle of incidence of a user of a vehicle based navigation system in accordance with embodiments of the present invention. In one embodiment of the invention, the vehicle based navigation system comprises a touch sensitive screen 380. The angle of incidence 310 can be determined by the angle of a finger, for example, that is interfacing with the touch sensitive display device 380. For example, if the angle of incidence with respect to the touch sensitive display device 380 corresponds to a user in the driver's seat 360, the vehicle based navigation system will not permit particular functionality while the vehicle is in motion. However, if the angle of incidence 310 corresponds to a user in the front passenger's seat (or the rear seats) 370 (and provided the seatbelt is engaged and the weight requirement is satisfied) the passenger will be allowed to operate the vehicle based navigation system while the vehicle is in motion. In one embodiment of the invention, an infrared detector or the like can be used to determine the angle of an arm or hand interfacing with the controls of the navigation system. In one embodiment of the invention, an infrared sensor is used to determine an angle of interaction.

In another embodiment of the invention, a first sound detector 365 is located proximate the driver's seat 360 and a second sound detector 375 is located proximate the front passenger's seat 370. If voice command (e.g., directed at controlling the vehicle based navigation system) is determined to be coming from the driver's seat 360 (e.g., sound detector 365 receives a stronger signal), the vehicle based navigation system will not permit particular functionality while the vehicle is in motion. However, if the voice command is determined to be coming from the passenger's seat 370 (e.g., the sound detector 375 receives a stronger signal) and provided the seatbelt is engaged and the weight requirement is satisfied, the passenger will be allowed to operate the vehicle based navigation system while the vehicle is in motion.

Figure 4:
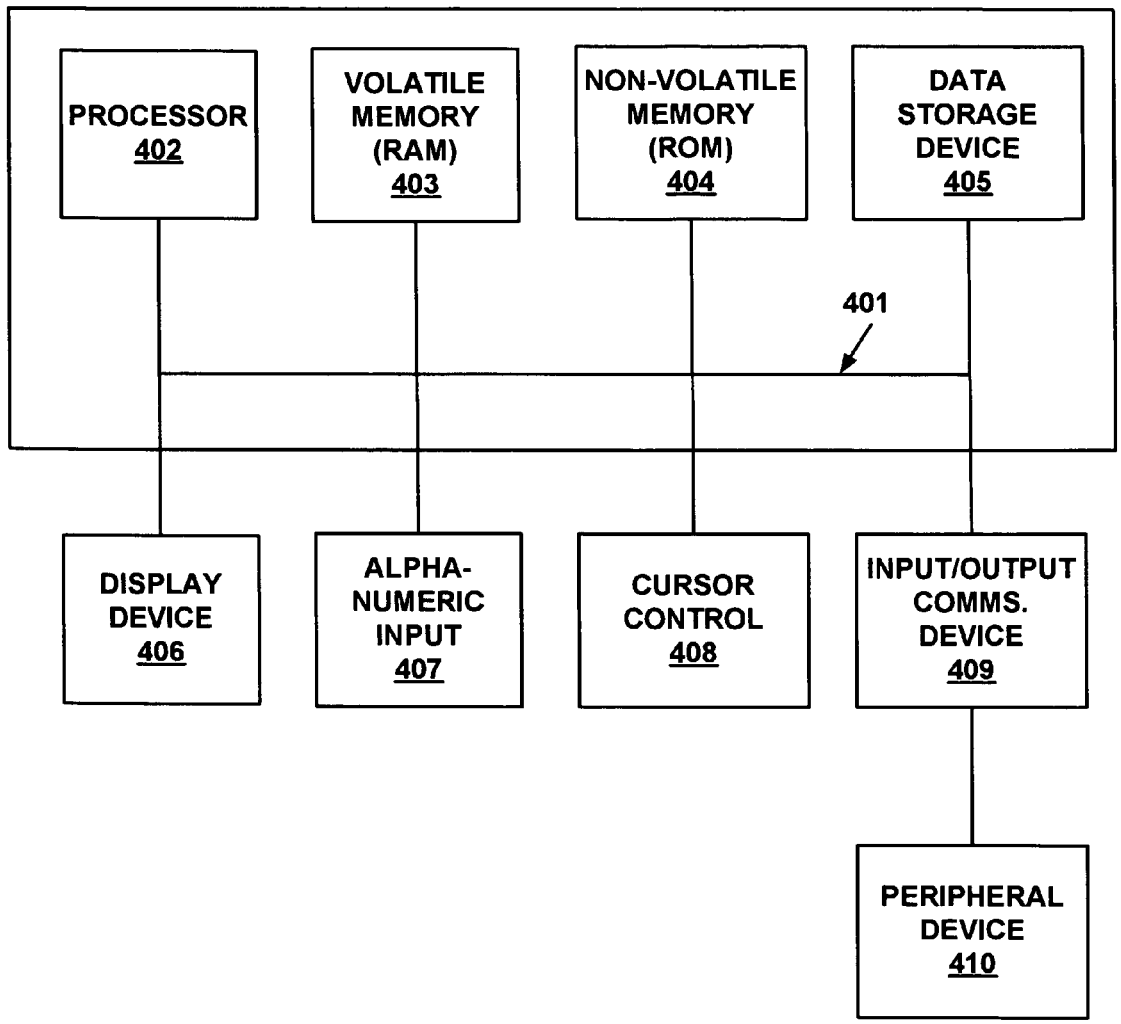
FIG. 4 is a block diagram of exemplary computer system in accordance with embodiments of the present invention.

Referring now to FIG. 4, a block diagram of exemplary computer system 400 is shown. It is appreciated that computer system 400 of FIG. 4 described herein illustrates an exemplary configuration of an operational platform upon which embodiments of the present invention can be implemented. In one embodiment of the invention, system 400 is the controller 199 of FIG. 1. In another embodiment of the invention, system 400 is part of navigation system 180 of FIG. 1. It is appreciated that system 400 may include both controller 199 and navigation system 180 as a single unit. Nevertheless, other computer systems with differing configurations can also be used in place of computer system 400 within the scope of the present invention. For example, computer system 400 could be a vehicle based navigation system, a vehicle control system, or an embedded computer system such as a global positioning system or audio/video system. Furthermore, computer system 400 could be a multiprocessor computer system.

Computer system 400 includes an address/data bus 401 for communicating information, a central processor 402 coupled with bus 401 for processing information and instructions, a volatile memory unit 403 (e.g., random access memory, static RAM, dynamic RAM, etc.) coupled with bus 401 for storing information and instructions for central processor 402 and a non-volatile memory unit 404 (e.g., read only memory, programmable ROM, flash memory, EPROM, EEPROM, etc.) coupled with bus 401 for storing static information and instructions for processor 402. Computer system 400 may also contain optional display devices 406 coupled to bus 401 for displaying information to the computer user. In one embodiment of the invention, display device 406 is a touch sensitive display device. Moreover, computer system 400 also includes a data storage device 405 (e.g., disk drive) for storing information and instructions.

Also included in computer system 400 of FIG. 4 is an optional alphanumeric input device 407. Device 407 can communicate information and command selections to central processor 402. Computer system 400 also includes an optional cursor control or directing device 408 coupled to bus 401 for communicating user input information and command selections to central processor 402. Computer system 400 also includes signal communication interface 409, which is also coupled to bus 401, and can be a serial port. Communication interface 409 can also include number of wireless communication mechanisms such as infrared or a Bluetooth protocol. Peripheral device 410 is coupled to bus 401 and can be a motion sensor, a camera, a weight sensor, a seatbelt sensor, an incidence angle sensor, an airbag deployment device, or any other peripheral device in accordance with the present invention.

Embodiments of the present invention, a system and method for safely operating a vehicle based navigation system while the vehicle is in motion have been described. While the present invention has been described in particular embodiments, it should be appreciated that the present invention should not be construed as limited by such embodiments, but rather construed according to the following Claims.

What is claimed is:

1. A computer implemented method for safely operating a vehicle based electronic system comprising:
    receiving a first signal from a first sensor, said first signal detecting the presence of a passenger located in a passenger seat of said vehicle;
    receiving a second signal from a second sensor, said second sensor determining said passenger is operating said vehicle based electronic system from said passenger seat;
    determining an angle of incidence of said passenger with respect to said vehicle based electronic system; and
    provided said passenger is located in said passenger seat; said passenger is operating said vehicle based electronic system from said passenger seat; and said angle of incidence is within a predetermined range, allowing said user interactive functionality of said electronic system while said vehicle is in motion and otherwise preventing said user interface functionality while said vehicle is in motion.

2. The method as described in claim 1 further comprising:
    receiving a third signal from a third sensor, said third sensor determining a weight of said passenger in said passenger seat.

3. The method as described in claim 1 wherein said first sensor is part of an airbag deployment system associated with said vehicle.

4. The method as described in claim 1 wherein said passenger seat is adjacent to a driver seat of said vehicle.

5. The method as described in claim 1 wherein said first sensor determines engagement of a seatbelt mechanism associated with said passenger seat.

6. The method as described in claim 1 wherein said first sensor comprises an infrared sensor for identifying said presence of said passenger.

7. The method as described in claim 1 wherein said user interactive functionality comprises operating a vehicle based navigation system.

8. A computer readable medium comprising executable instructions which, when executed in a processing system, causes the system to perform a method of controlling operation of a vehicle-based electronic system comprising:
    receiving a first signal from a first sensor, said first signal detecting the presence of a passenger located in a passenger seat of said vehicle;
    receiving a second signal from a second sensor, said second sensor determining said passenger is operating said vehicle based electronic system from said passenger seat; and
    provided said passenger is located in said passenger seat and said passenger is operating said vehicle based electronic system from said passenger seat, allowing user interactive functionality of said electronic system while said vehicle is in motion otherwise preventing said user interface functionality while said vehicle is in motion;
    wherein said second signal indicates an angle of incidence of an operator interaction with said electronic system.

9. The computer readable medium as described in claim 8 wherein said method further comprises:
    provided said angle of incidence is within a predetermined range, allowing said user interaction functionality of said vehicle based electronic system while said vehicle is in motion.

10. The computer readable medium as described in claim 8 wherein said vehicle based electronic system is an entertainment system or a vehicle based navigation system.

11. The computer readable medium as described in claim 8 wherein said first sensor determines engagement of a seatbelt mechanism associated with said passenger seat.

12. The computer readable medium as described in claim 8 wherein said first sensor comprises an infrared sensor for identifying said presence of said passenger.

13. A system for allowing use of a vehicle based electronic system while in motion comprising:
- a first sensor coupled to a bus, said first sensor for identifying the presence of a passenger located in a passenger seat of a vehicle;
- a second sensor coupled to said bus, said second sensor for sensing an angle of incidence of an operation of said passenger with respect to said electronic device; and
- a determiner coupled to said bus, said determiner generating a signal for allowing user interactive functionality of said vehicle based electronic system when said vehicle is in motion provided said passenger is located in said passenger seat and provided said angle of operation is within a predetermined range.

14. The system as described in claim 13 wherein said first sensor is part of an airbag deployment system associated with said vehicle.

15. The system as described in claim 13 wherein said first sensor determines engagement of a seatbelt mechanism associated with said passenger seat.

16. The system as described in claim 13 wherein said first sensor comprises an infrared sensor for identifying said passenger.

17. The system as described in claim 13 wherein said vehicle based electronic device is an entertainment system or a vehicle based navigation system.

18. The system as described in claim 13 further comprising:
- a third sensor for determining a weight of said passenger; and provided said weight is above a threshold value, said determiner generating a signal for allowing user interactive functionality of said vehicle based electronic system when said vehicle is in motion.

* * * * *